(12) United States Patent
Park et al.

(10) Patent No.: US 8,999,588 B2
(45) Date of Patent: Apr. 7, 2015

(54) POSITIVE ELECTRODE FOR A LITHIUM BATTERY

(71) Applicant: UChicago Argonne, LLC, Chicago, IL (US)

(72) Inventors: Sang-Ho Park, Cheonan-si (KR); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 349 days.

(21) Appl. No.: 13/621,934

(22) Filed: Sep. 18, 2012

(65) Prior Publication Data

US 2013/0022874 A1    Jan. 24, 2013

Related U.S. Application Data

(63) Continuation of application No. 12/331,873, filed on Dec. 10, 2008.

(60) Provisional application No. 61/013,514, filed on Dec. 13, 2007.

(51) Int. Cl.
| | |
|---|---|
| *H01M 6/18* | (2006.01) |
| *H01M 4/00* | (2006.01) |
| *H01M 10/0562* | (2010.01) |
| *H01M 4/485* | (2010.01) |
| *B82Y 30/00* | (2011.01) |
| *C01G 45/12* | (2006.01) |
| *C01G 51/00* | (2006.01) |
| *C01G 53/00* | (2006.01) |
| *H01M 4/36* | (2006.01) |
| *H01M 4/505* | (2010.01) |
| *H01M 4/525* | (2010.01) |
| *H01M 10/0525* | (2010.01) |

(52) U.S. Cl.
CPC ............... *H01M 4/485* (2013.01); *B82Y 30/00* (2013.01); *C01G 45/1228* (2013.01); *C01G 51/006* (2013.01); *C01G 51/50* (2013.01); *C01G 53/006* (2013.01); *C01G 53/50* (2013.01); *C01P 2002/08* (2013.01); *C01P 2002/52* (2013.01); *C01P 2002/72* (2013.01); *C01P 2004/03* (2013.01); *C01P 2004/61* (2013.01); *C01P 2004/62* (2013.01); *C01P 2004/64* (2013.01); *C01P 2006/40* (2013.01); *H01M 4/364* (2013.01); *H01M 4/505* (2013.01); *H01M 4/525* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 5,378,560 A | 1/1995 | Tomiyama |
| 2003/0129495 A1 | 7/2003 | Yamato et al. |
| 2005/0058588 A1 | 3/2005 | Kang et al. |
| 2007/0218361 A1 | 9/2007 | Inoue et al. |

FOREIGN PATENT DOCUMENTS

| | | |
|---|---|---|
| WO | WO-2006/104367 A3 | 10/2006 |
| WO | WO-2007/041209 | 4/2007 |

OTHER PUBLICATIONS

Breger, J. et al., "High-Resolution X-Ray Diffraction, DIFFaX, NMR and First Principles Study of Disorder in the Li2MnO3-Li[Ni1/2Mn1/2]O2 Solid Solution," Journal of Solid State Chemistry, 2005, 178, pp. 2575-2585.
Kang, K. et al., "Electrodes with High Power and High Capacity for Rechargeable Lithium Batteries," Science, 2006, 311, pp. 977-980.
Non-Final Office Action on U.S. Appl. 12/331,873, mailed Oct. 3, 2011.
US Notice of Allowance on U.S. Appl. 12/331,873, mailed Aug. 1, 2012.

*Primary Examiner* — Melvin C Mayes
*Assistant Examiner* — Sheng H Davis
(74) *Attorney, Agent, or Firm* — Foley & Lardner LLP

(57) ABSTRACT

A method for producing a lithium alkali transition metal oxide for use as a positive electrode material for lithium secondary batteries by a precipitation method. The positive electrode material is a lithium alkali transition metal composite oxide and is prepared by mixing a solid state mixed with alkali and transition metal carbonate and a lithium source. The mixture is thermally treated to obtain a small amount of alkali metal residual in the lithium transition metal composite oxide cathode material.

9 Claims, 6 Drawing Sheets

United States Patent 8,999,588 B2

POSITIVE ELECTRODE FOR A LITHIUM BATTERY

CROSS-REFERENCE TO RELATED APPLICATIONS

This application is a continuation of U.S. patent application Ser. No. 12/331,873, filed on Dec. 10, 2008, now U.S. Pat. No. 8,338,037, and which claims the benefit of U.S. Provisional Application No. 61/013,514, filed Dec. 13, 2007, both of which are incorporated herein by reference, in their entirety, for any and all purposes.

GOVERNMENT RIGHTS

The United States Government has rights in this invention pursuant to DOE Contract No. EE-2G-49845-00-107 between the United States Government and UChicago Argonne, LLC.

FIELD

The invention is generally related to batteries. More specifically, the invention is related to cathode materials for lithium batteries.

BACKGROUND

Secondary batteries are used as the distribution of power sources for electronic devices, such as mobile communication equipment, pda notebooks, digital cameras, digital camcorders, electric vehicles (EV), and hybrid electric vehicles (HEV). In particular, high power and energy of the transportation vehicles largely rely upon secondary batteries. In addition, lithium secondary batteries have been drawing attention in terms of there use in high voltage and high energy density applications. Thus, there exists a strong need for high-performance secondary batteries. The characteristics required for such secondary batteries include excellent charge-discharge characteristics, long life characteristics, high-rate characteristics, and good thermal stability at high temperatures.

Lithium secondary batteries are classified into lithium batteries that use lithium metal as a negative electrode and lithium ion batteries that use carbon negative electrodes that are capable of intercalating/deintercalating lithium ions in an inter-layered compound. Lithium secondary batteries are often classified by the type of electrolyte. For example, some type are liquid type batteries, gel type polymer batteries, and solid polymer batteries.

In commercial lithium-ion secondary batteries, $LiCoO_2$ is typically used as the positive electrode material and graphite is used as a negative electrode material. Other positive electrode materials include $LiNiO_2$, $LiCo_xNi_{1-x}O_2$, $LiMn_2O_4$, and other conventional lithium compounds known in the art. $LiCoO_2$ is stable to charge-discharge events and it exhibits favorable discharge voltage characteristics. However, cobalt is an expensive metal with unfavorable environmental toxicity. Therefore, the use of cobalt in large scale batteries may be prohibitive.

$LiNiO_2$ is one alternative material to $LiCoO_2$. However, Ni-based metal oxides are expensive, primarily due to the cost of Ni, are difficult to synthesize, and possess poor thermal stability. $LiMn_2O_4$ spinel is a widely used positive electrode material, due to its relatively low cost and ease of synthesis. However, in spinel-type $LiMn_2O_4$ electrodes for 4V grade secondary batteries, Mn ions are easily dissolved, which may lead to poisoning of the graphite anode. Also, the theoretical charge capacity of $LiMn_2O_4$ is only about 148 mAh/g, which is lower than the other positive Li-ion electrode materials. Also, its theoretical energy is only about half that of the other positive Li-ion electrode materials.

Methods of preparing the cathode materials include both solid-state and wet methods. Solid-state reactions typically include the mixing and grinding of carbonates or hydroxides of each of the transition metal constituent elements, and then firing the ground mixture. The procedure is typically repeated several times. However, solid-state reaction processes surfer the following drawbacks: i) irregular phases due to non-homogeneous reaction conditions, ii) particle shape and size is difficult to control, and iii) high production temperature and long production time are required. Unlike solid-state reaction processes, wet chemical processes, also known as a sol-gel process, allow for the control of each constituent element at the element level. Using sol-gel methods, high purity transition composite oxides may be obtained. However, such production methods tend to be very expensive. This method uses a starting material such as a soluble acetate (e.g., lithium acetate, cobalt, nickel, manganese acetate) in which the residual water is removed. This requires long production times, and particle agglomeration and uniformity problems are exhibited.

Thus, there is a need for a composite oxide positive electrode material having a layered crystal structure, and methods for making the same, which are capable of solving at least some of the above-referenced shortcomings of present technology, while at the same time, maintaining the advantages of the Co, Ni, and Mn oxides.

SUMMARY

In one aspect, an positive electrode for a lithium secondary battery is provided having a layered structure that may be referred to as a Li—Na—Ni—Mn composite oxide. In another aspect, a method is provided for preparing the materials for the positive electrode.

In some embodiments, the positive electrode has the general formula: $xLiMM'O_2 \cdot (1-x)Li_2MnO_3$ where x and (1−x) are the ratio of the components, M is Ni, Co, or a mixture of Ni and Co, and M' is Na, K, Rb, Cs, or a mixture of any two or more. The $LiMM'O_2$ and the $Li_2MnO_3$ components are layered and the ratio of Li to M and Mn is greater than, or equal to, one, but less than two. In one example, the layers are $LiCoNaO_2$ and $Li_2MnO_3$. Methods include producing a mixed transition metal composite oxide with nano-sized crystalline materials. The cathode materials have an average particle size of approximately 10 micrometers with a secondary spherical morphology containing nano-sized primary particles. The cathode material participates in the cell through a chemical reaction of lithium intercalation/deintercalation.

In one aspect, a positive electrode of a general formula $xLiA_{a'}Ni_\alpha Co_\beta Mn_\gamma Mo_\delta M_y O_2 \cdot (1-x)Li_2Mn_\gamma M''_\psi O_3$ is provided, where the $LiA_{a'}Ni_\alpha Co_\beta Mn_\gamma Mo_\delta M_y O_2$ and the $Li_2Mn_\gamma M''_\beta O_3$ components form a layered structure; A is Na, K, or a mixture of Na and K; M is Mg, Zn, Al, Ga, B, Zr, Si, Ti, Nb, W, or a mixture of any two or more; X is F, S, Cl, I, or a mixture of any two or more; x ranges from 0 to 1; a' ranges from 0.01 to about 0.1; α ranges from 0.01 to 1; β ranges from 0 to 1; ψ ranges from 0 to 1; γ ranges from 0.01 to 1; δ ranges from 0 to 0.2; y ranges from 0 to 0.15; and z ranges from 0 to about 0.33. In some embodiments, A is Na. In some embodiments, ψ ranges from 0.01 to 1. In some embodiments, A is Na, and ψ is 0.

In another aspect, a process is provided for producing a transition metal carbonate including precipitating a precipitate of oxide powders from a solution including a $Na_2CO_3$, $NaHCO_3$, $NaOH$, or a mixture of any two or more thereof; a compound of Formula II; and a mixed lithium source; and calcining the precipitate of oxide powders to obtain a compound of Formula I, where the compound of Formula I is $Li_{1+x'}NaNi_\alpha Co_\beta Mn_\gamma Mo_\delta M_y O_{2-z} X_z$; the compound of Formula II is $Na_{a'}Ni_\alpha Co_\beta Mn_\gamma M_\kappa O_2$; M is Ca, Mg, Zn, Al, Ga, B, Zr, Si, Ti, Nb, W, or a mixture of any two or more; X is F, S, Cl, I, or a mixture of any two or more; x' ranges from 0 to about 0.33; a' ranges from 0 to about 0.1; $\alpha$, $\beta$, and $\gamma$ independently range from 0 to 1; $\delta$ ranges from 0 to 0.2; $\kappa$ ranges from 0.01 to 0.15; y ranges from 0 to 0.15; and z ranges from 0 to about 0.33. In some embodiments, process further includes filtering and washing of the precipitate prior to calcining. In some embodiments, the solution further includes $CaCO_3$, $Ca(OH)_2$, or a mixture of $CaCO_3$ and $Ca(OH)_2$.

In another aspect, a process for producing a transition metal carbonate includes precipitating a precipitate of oxide powders from a solution including $A_2CO_3$, $AHCO_3$, $AOH$, or a mixture of any two or more thereof; a compound of Formula II; and a mixed lithium source; and calcining the precipitate of oxide powders to obtain a compound of Formula III; where the compound of Formula III is $Li_{1+x'}A_a Ni_\alpha Co_\beta Mn_\gamma Mo_\delta M_y O_{2-z} X_z$; the compound of Formula II is $A_a Ni_\alpha Co_\beta Mn_\gamma M_\kappa O_2$; A is Na, K, or a mixture of Na and K; M is Ca, Mg, Zn, Al, Ga, B, Zr, Si, Ti, Nb, W, or a mixture of any two or more; X is F, S, Cl, I, or a mixture of any two or more; x ranges from 0 to about 0.33; a' ranges from 0 to about 0.1; $\alpha$, $\beta$, and $\gamma$ independently range from 0 to 1; $\delta$ ranges from 0 to 0.2; $\kappa$ ranges from 0.01 to 0.15; y ranges from 0 to 0.15; and z ranges from 0 to about 0.33. In some embodiments, the process further includes filtering and washing of the precipitate prior to calcining. In some embodiments, the solution further includes $CaCO_3$, $Ca(OH)_2$, or a mixture of $CaCO_3$ and $Ca(OH)_2$. In another aspect, a cathode material includes the compound of Formula I produced by the above process.

In another aspect, a cathode material includes the compound of Formula I produced by any of the embodied processes. In some embodiments, cathode material has a plurality of primary particles of less than about 300 nm in size and a plurality of nano-sized particles having an average secondary diameter of less than about 100 microns, less than about 90 microns, less than about 80 microns, less than about 70 microns, less than about 60 microns, less than about 50 microns, less than about 40 microns, less than about 30 microns, or less than about 20 microns.

In another aspect, a rechargeable secondary battery electrode includes the compound of Formula I produced by any of the embodied processes.

DETAILED DESCRIPTION

Figure 1:
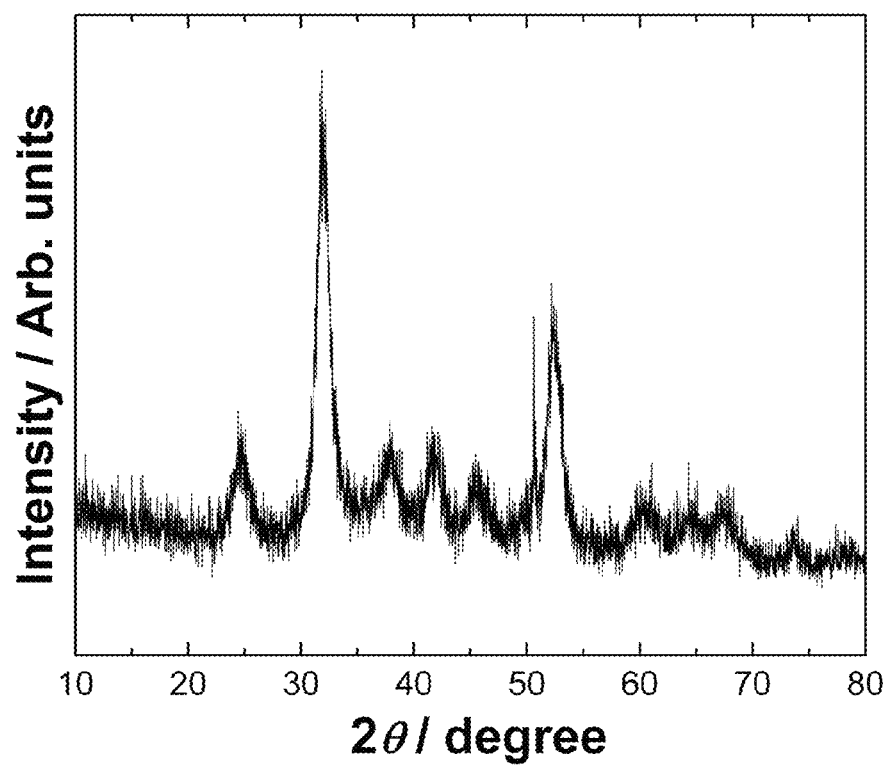
FIG. 1 includes X-ray diffraction (XRD) patterns of a $(Na_a Ni_{1/2} Mn_{1/2})CO_3$ precursor prepared by a carbonate precipitation method, according to some embodiments.
Figure 2:
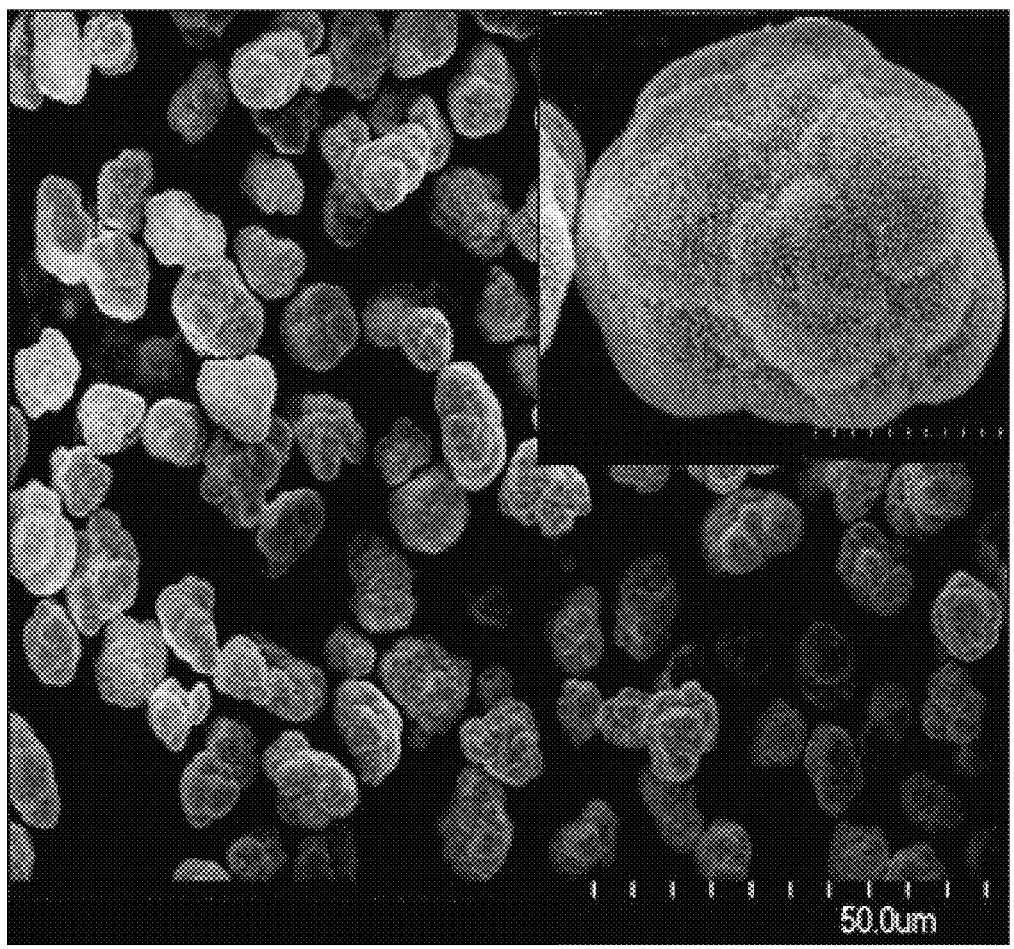
FIG. 2 is photograph of an example of two levels of magnification of scanning electron microscopy (SEM) images of a $Na_a(Ni_{1/2}Mn_{1/2})CO_3$ precursor, according to one embodiment. In the inset photograph, the hash marks are at 5 μm intervals.
Figure 3:
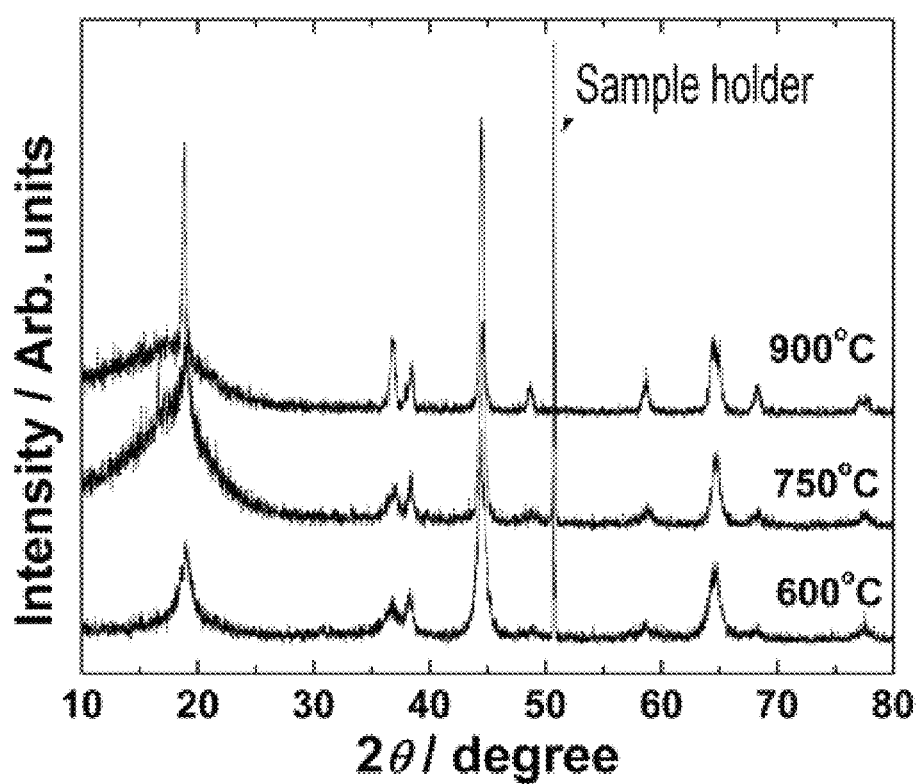
FIG. 3 includes XRD patterns of $Li(Na_a Ni_{1/2} Mn_{1/2})O_2$ precursor prepared at various temperatures of calcination, according to one embodiment.
Figure 4:
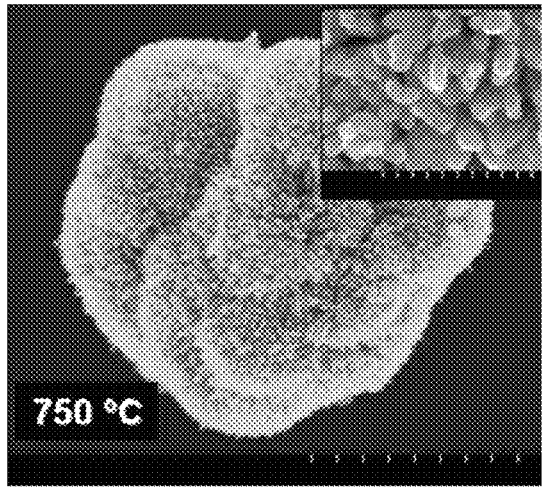
FIG. 4 are photographs of two levels of magnification of the scanning electron microscopy (SEM) images of $Li(Na_a Ni_{1/2} Mn_{1/2})O_2$ materials prepared by various temperatures of calcination, according to one embodiment. In each photograph, the large photo scale is at 5 μm and the inset photo is at 500 nm.
Figure 4:
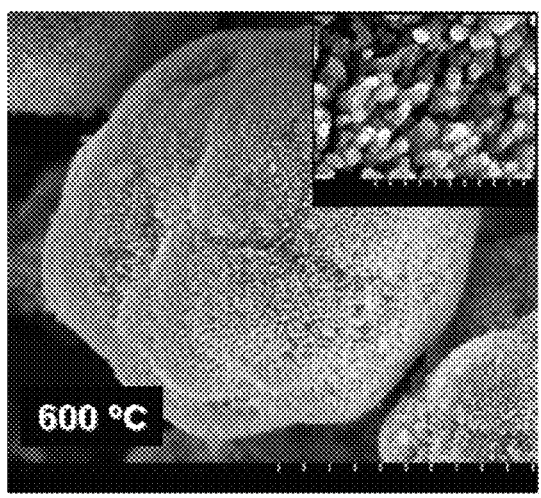
Figure 4:
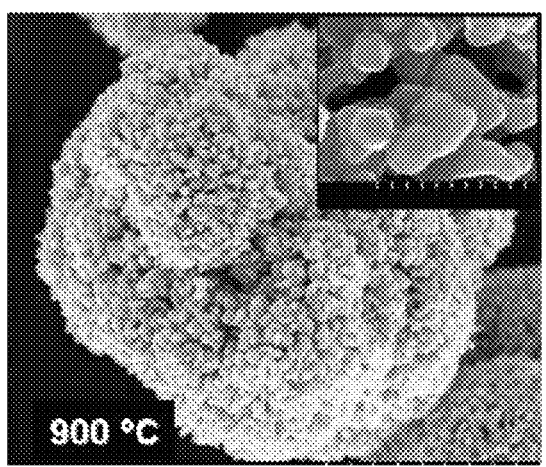
Figure 5:
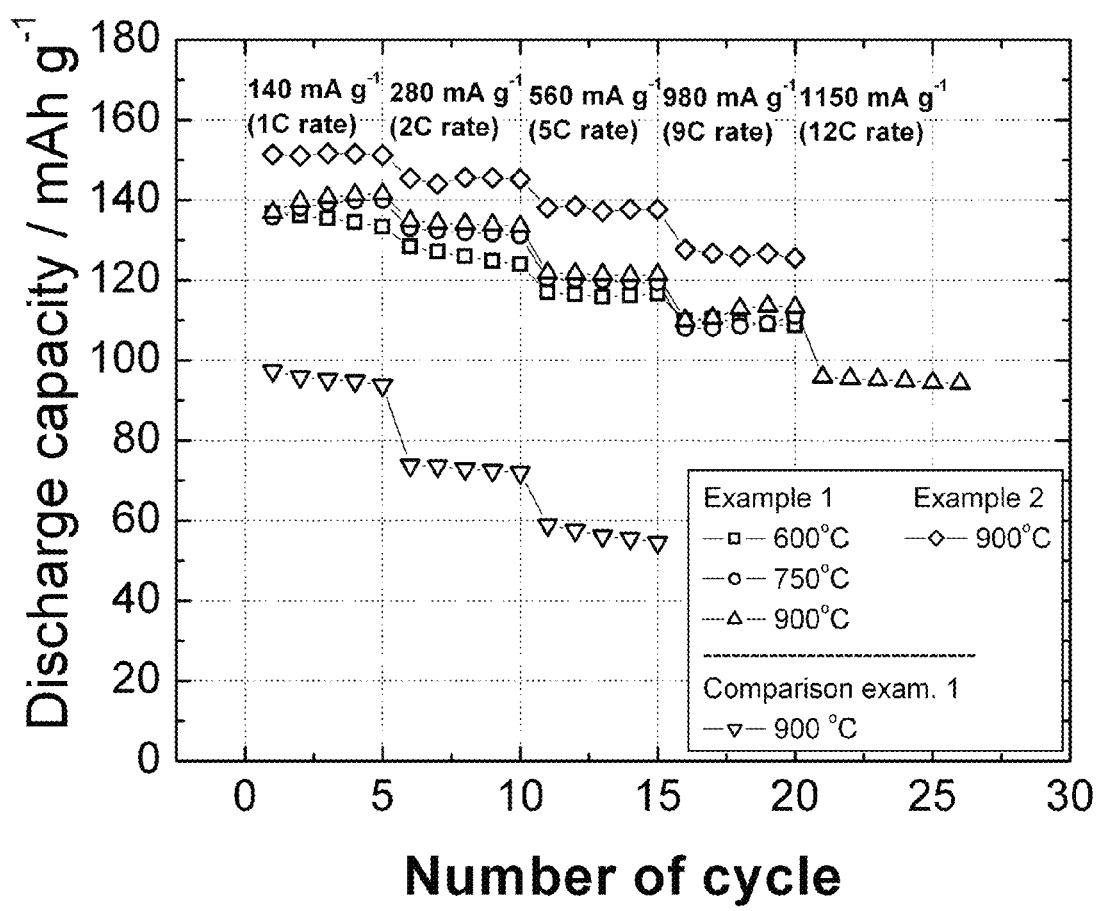
FIG. 5 is a rate capability chart of Examples 1 and 2 in comparison to Comparative Example 1.
Figure 6:
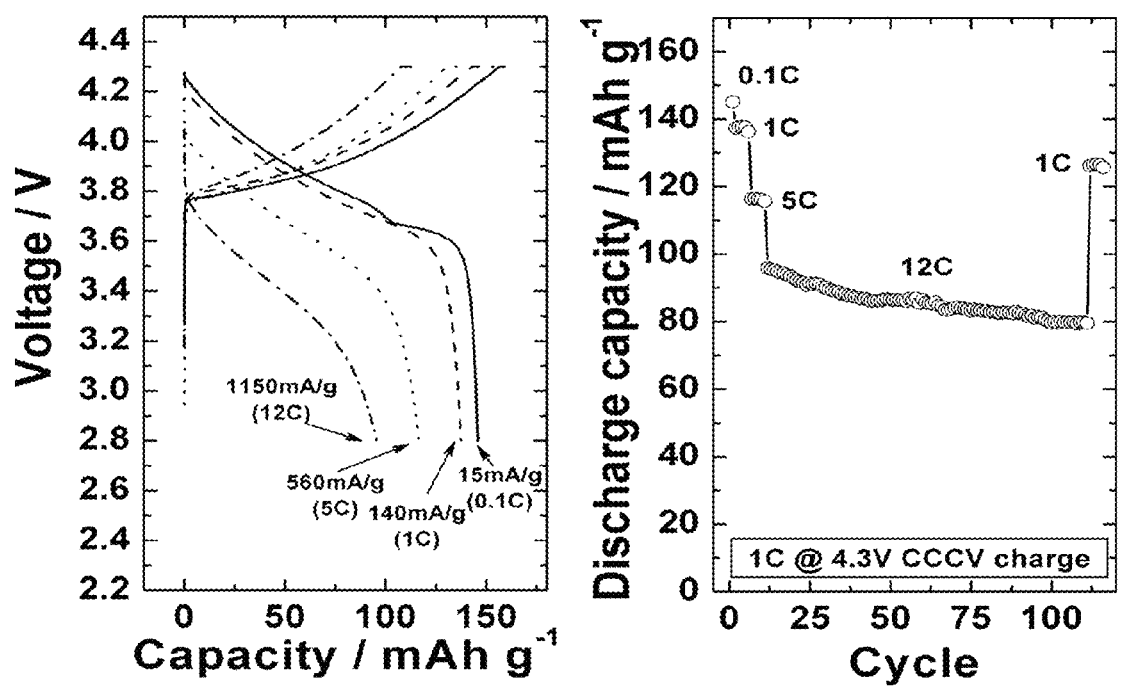
FIG. 6 includes voltage profiles and high rate cycling properties of 900° C. sample of Example 1, according to one embodiment.

In one aspect, a cathode material (i.e. a material for a positive electrode) is provided comprising a lithium nickel-manganese layered oxide, a lithium nickel-cobalt-manganese layered oxide, or composite transition metal oxides including alkali metal. The cathode materials have an average particle size of approximately 10 μm, and a secondary spherical morphology having nano-sized primary particles. In some embodiments, the nano-sized primary particle size is less than 100 nm, less than 75 nm, less than 50 nm, or less than 25 nm. In an electrochemical cell, positive electrodes prepared from the cathode materials participate in the cell through intercalation/deintercalation of lithium.

The cathode materials include, for example, a layered structure of the Li—Na—Ni—Co—Mn series, such as that represented by Formula III: $Li_{1+x'}A_a Ni_\alpha Co_\beta Mn_\gamma Mo_\delta M_y O_{2-z} X_z$, where A is Na, K, or Ca; M is Mg, Zn, Al, Ga, B, Zr, Si, Ti, Nb, or W; X is F, S, Cl, or I; x' ranges from 0 to about 0.33; a' ranges from 0 to about 0.1; $\alpha$, $\beta$, and $\gamma$ independently range from 0 to 1; $\delta$ ranges from 0 to 0.2; y ranges from 0 to 0.15; and z ranges from 0 to about 0.33. Examples of Formula III, include, but are not limited to, $(Na_a Ni_{1/2} Mn_{1/2})CO_3$; $Li_{1+x'}(Na_a Ni_{1/2} Mn_{1/2})O_2$; $(Na_a Ni_{1/3} CO_{1/3} Mn_{1/3})CO_3$; $Li_{1+x'}(Na_a Ni_{1/3} CO_{1/3} Mn_{1/3})O_2$; $Li_{1+x'}(Na_a Ni_{1/3} Co_{1/3} Mn_{1/3})Mo_y O_2$; and $Li_{1+x'}(Na_a Ni_{1/3} CO_{1/3} Mn_{1/3})Mo_y O_{2-z}F_z$, where (0<a'<0.1; 0<x'<0.33; 0<y<0.15; 0<z<0.1). In some embodiments, y is represented as $\kappa$ having a range of 0.01 to 0.15.

The cathode materials have theoretical capacities ranging from about 200 mAh/g to about 350 mAh/g, from about 225 mAh/g to about 325 mAh/g, from about 250 mAh/g to about 300 mAh/g, from about 270 mAh/g to about 295 mAh/g, or from about 275 mAh/g to about 290 mAh/g. In some embodiment the capacity is about 285 mAh/g.

The cathode materials may be used in the preparation of positive electrodes of general formula $xLiA_a Ni_\alpha Co_\beta Mn_\gamma Mo_\delta M_y O_2 \cdot (1-x)Li_2 Mn_x M''_\psi O_3$. In such general formulas, the $LiA_a Ni_\alpha Co_\beta Mn_\gamma Mo_\delta M_y O_2$ and $Li_2 Mn_x M''_\psi O_3$ components form a layered structure. In the general formula, A may be Na, K, or a mixture of Na and K; M may be Mg, Zn, Al, Ga, B, Zr, Si, Ti, Nb, W, or a mixture of any two or more; X may be F, S, Cl, I, or a mixture of any two or more; x ranges from 0 to 1; a' ranges from 0.01 to about 0.1; $\alpha$ ranges from 0.01 to 1; $\beta$ ranges from 0 to 1; $\psi$ ranges from 0 to 1; $\gamma$ ranges from 0.01 to 1; $\delta$ ranges from 0 to 0.2; y ranges from 0 to 0.15; and z ranges from 0 to about 0.33. In some embodiments, A is Na. In other embodiments, $\psi$ ranges from 0.01 to 1. In yet other embodiments, $\alpha$ is 1, A is Na, and $\psi$ is 0. In other embodiments, x ranges from 0.01 to 1. In other embodiments, $\beta$ ranges from 0.01 to 1. In other embodiments, $\psi$ ranges from 0.01 to 1. In other embodiments, $\delta$ ranges from 0.01 to 0.2. In other embodiments, y ranges from 0.01 to 0.15. In other embodiments, z ranges from 0.01 to about 0.33.

In another aspect, a process is provided for producing a nickel-manganese carbonate precursor, nickel-cobalt-manganese carbonate precursor, or mixed transition metal carbonate, mixed transition metal hydroxide, and/or mixed transition metal oxalate precursor, including alkali metal, which were prepared by co-precipitation methods.

In another aspect, processes are provided for producing a mixed transition metal composite oxides with nano-sized crystalline materials for use as positive electrode materials in lithium secondary batteries. The steps of preparing the mixed transition metal composite oxide include preparing a transition metal carbonate precursor that is pre-calcined to obtain an intermediate composite oxide powder with a higher packing density compared with transition metal carbonate precursor. The processes also include blending a lithium source with the intermediate composite oxide powder, followed by thermally treating the mixture. The treatment is performed in a temperature range of about 600° C. to about 1000° C.

In some embodiments, the processes include calcining the mixture at over 600° C. in a furnace. The process may be carried out in a furnace known to those of skill in the art. For example, a box furnace may be used for uniform heating. The process may also include producing composite cathode materials for lithium secondary batteries, where an alkali metal such as Na and/or K, or an alkaline earth metal such as Ca or Mg remains in the Li—Ni—Mn composite oxide. Additional alkali metal ions may remain in the lithium composite oxides.

In order to obtain a Na containing transition metal composite of the cathode materials, a (Na—Ni—Co—Mn)$CO_3$ precursor was prepared from a sodium-based carbonate precursor, such as $Na_2CO_3$, that undergoes precipitation, followed by simple washing with distilled water, and drying in an air blowing oven at about 100° C. In order to obtain a K containing transition metal composite of the cathode materials, a (K—Ni—Co—Mn)$CO_3$ precursor was prepared from a potassium-based carbonate precursor, such as $K_2CO_3$, that undergoes precipitation, followed by simple washing with distilled water, and drying in an air blowing oven at about 100° C. The precursors were then mixed with lithium sources and heated at 600° C., followed by re-calcining at 900° C. in a box furnace. No particular limitation is imposed on the sequence of addition of the sodium carbonate, sodium hydroxide, potassium carbonate, or potassium bicarbonate in the precipitation steps, when used to effect the metal carbonate and/or hydroxide precipitation. Also, there is no limitation on the identity of the composite transition metal source, such as, composite transition metal hydroxides, composite transition metal carbonates, and/or composite transition metal oxalates. Lithium sources may include, without limitation, lithium hydroxide, lithium carbonate, lithium acetate, or lithium nitrate.

In some embodiments of the process for producing a transition metal carbonate, a precipitate of oxide powders is formed from a solution following by calcining to obtain a compound of Formula I. Formula I is a compound of general formula $Li_{1+x'}NaNi_\alpha Co_\beta Mn_\gamma Mo_\delta M_y O_{2-z}X_z$ where M is Ca, Mg, Zn, Al, Ga, B, Zr, Si, Ti, Nb, W, or a mixture of any two or more; X is F, S, Cl, I, or a mixture of any two or more; x' ranges from 0 to about 0.33; a' ranges from 0 to about 0.1; $\alpha$, $\beta$, and $\gamma$ independently range from 0 to 1; $\delta$ ranges from 0 to 0.2; y ranges from 0 to 0.15; and z ranges from 0 to about 0.33. In some embodiments the solution includes $Na_2CO_3$, $NaHCO_3$, NaOH, or a mixture of any two or more, a compound of Formula II, and a mixed lithium source. Formula II is a compound of general formula $Na_a Ni_\alpha Co_\beta Mn_\gamma M_\kappa O_2$, where M is Ca, Mg, Zn, Al, Ga, B, Zr, Si, Ti, Nb, W, or a mixture of any two or more; a' ranges from 0 to about 0.1; $\alpha$, $\beta$, and $\gamma$ independently range from 0 to 1; and $\kappa$ ranges from 0.01 to 0.15. The compound of Formula I thus produced may be incorporated in cathode materials. In various embodiments, x' may range from 0.01 to about 0.33, a' may range from 0.01 to about 0.1; $\alpha$, $\beta$, and $\gamma$ may independently range from 0.01 to 1; $\delta$ may range from 0.01 to 0.2; y may range from 0.01 to 0.15; and/or z may range from 0 to about 0.33.

In some embodiments of the process for producing a transition metal carbonate a precipitate of oxide powders is formed from a solution following by calcining to obtain a compound of Formula III. In some embodiments the solution comprises a $A_2CO_3$, $AHCO_3$, AOH, or a mixture of any two or more there; a compound of Formula II; and a mixed lithium source. In such embodiments, the compound of Formula III is $Li_{1+x'}A_{a'}Ni_\alpha Co_\beta Mn_\gamma Mo_\delta M_y O_{2-z}X_z$ and the compound of Formula II is $A_{a'}Ni_\alpha Co_\beta Mn_\gamma M_\kappa O_2$. In such embodiments, A is Na, K, or a mixture of Na and K; M is Ca, Mg, Zn, Al, Ga, B, Zr, Si, Ti, Nb, W, or a mixture of any two or more; X is F, S, Cl, I, or a mixture of any two or more; x' ranges from 0 to about 0.33; a' ranges from 0 to about 0.1; $\alpha$, $\beta$, and $\gamma$ independently range from 0 to 1; $\delta$ ranges from 0 to 0.2; $\kappa$ ranges from 0.01 to 0.15; y ranges from 0 to 0.15; and z ranges from 0 to about 0.33. The compound of Formula III thus produced may be incorporated into cathode materials. In various embodiments, x' may range from 0.01 to about 0.33; a' may range from 0.01 to about 0.1; $\alpha$, $\beta$, and $\gamma$ may independently range from 0.01 to 1; $\delta$ may range from 0.01 to 0.2; y may range from 0.01 to 0.15; and/or z may range from 0 to about 0.33.

The processes may also include other materials to incorporate additional metals into the metal oxide. For example, Ca, may be incorporated by the addition of a calcium salt such as $CaCO_3$, $Ca(OH)_2$, or a mixture thereof, to the solutions for precipitation as embodied above.

The processes may include a variety of other steps, including, but not limited to filtrations, and washings to isolate desired materials or remove undesired materials. The washings may done with a variety of solvents such as, but not limited to, water and alcohols, or other solvents known to those of skill in the art. For example, alcohols may include methanol, ethanol, propanol, iso-propanol, butanol, iso-butanol, or tert-butanol. Other solvents may include tetrahydrofuran, ethyl acetate, acetonitrile, acetone, etc.

Particle shape and size of the composite transition metal oxides are important to the rate capability and area specific impedance. The particles have a spherical morphology according to some embodiments. According to other embodiments, the average diameter for the particle size distribution may range from about 1 μm to about 10 μm, from about 1 μm to about 20 μm, from about 1 μm to about 50 μm, or from about 1 μm to about 100 μm. Alternatively, the spherical particles may have an average size diameter of less than 20 μm, and which may also have nano-sized primarily particles of less than 100 nm in size.

Cathode materials produced via the embodied processes may have a dual particle structure. For example, in some embodiments, the overall material have may have a primary particle structure in which the particles are on the order of less than about 300 nm in size, less than about 250 nm in size, less than about 200 nm in size, less than about 150 nm in size, less than about 100 nm in size, or less than about 50 nm in size. In other embodiments, the overall material have may have a primary particle structure in which the particles are on the order of from about 10 nm to about 300 nm, from about 10 nm to about 250 nm, from about 10 nm to about 200 nm, from about 10 nm to about 150 nm, from about 10 nm to about 100 nm, or from about 10 nm to about 50 nm.

A plurality of such particles may be agglomerated to form a secondary structure in which the particle size is on the micron scale. For example the secondary particle structure may have a average diameter of less than about 100 microns, less than about 90 microns, less than about 80 microns, less than about 70 microns, less than about 60 microns, less than about 50 microns, less than about 40 microns, less than about 30 microns, or less than about 20 microns. In some embodiments, the secondary particle structure may have an average diameter of diameter of from about 0.2 microns to about 100 microns, from about 0.2 microns to about 90 microns, from about 0.2 microns to about 80 microns, from about 0.2 microns to about 70 microns, from about 0.2 microns to about 60 microns, from about 0.2 microns to about 50 microns, from about 0.2 microns to about 40 microns, from about 0.2 microns to about 30 microns, or from about 0.2 microns to about 20 microns.

In some embodiments, composite transition metal carbonates are suitable for the aforementioned starting precursor. Such materials have nano-sized primary particles, easily react with a lithium source, and can be easily obtained as nano-sized primarily lithium transition metal oxides with reserved secondary spherical shapes.

The residual amounts of alkali metal in the precursors are not particularly limited. However, in order to obtain high rate capability, the amount of alkali metal is below about 10 mol % of the cathode materials. When the amount of residual alkali is in excess of about 10 mol %, the alkali metal can act by blocking the lithium movements. Thus, in some embodiments, the alkali is below about 10 mol %, below about 5 mol %, or below about 2 mol % of the cathode materials.

The composite oxides may be used to manufacture lithium secondary batteries having a cathode with high rate capability, and excellent cycle performance. Specifically, the materials may be used in rechargeable secondary battery electrodes. In addition, the Na residual composite oxide can be used to manufacture lithium secondary batteries for portable electronic devices. Such electronic devices are known to those of skill in the art and can include, but are not limited to mobile communication equipment, digital cameras, digital camcorders, and for large scale batteries, such as hybrid electric vehicles (HEV), electric vehicles (EV), and load leveling systems.

One skilled in the art will readily realize that all ranges and ratios discussed can and do necessarily also describe all subranges and subratios therein for all purposes and that all such subranges and subratios also form part and parcel of this invention. Any listed range or ratio can be easily recognized as sufficiently describing and enabling the same range or ratio being broken down into at least equal halves, thirds, quarters, fifths, tenths, etc. As a non-limiting example, each range or ratio discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed invention. Additionally the phrase "consisting essentially of" will be understood to include those elements specifically recited and those additional elements that do not materially affect the basic and novel characteristics of the claimed invention. The phrase "consisting of" excludes any element not specifically specified.

The present invention will be better understood by reference to the following examples which are intended for purposes of illustration and are not intended to nor are to be interpreted in any way as limiting the scope of the present invention, which is defined in the claims appended hereto.

EXAMPLES

Example 1

Na containing Ni—Mn composite carbonate ($Na_aNi_{1/2}Mn_{1/2}CO_3$) is prepared by carbonate co-precipitation. An aqueous solution of $NiSO_4 \cdot 6H_2O$, and $MnSO_4 \cdot 5H_2O$ (Ni:Mn=1:1) with a concentration of 2.0 M was pumped into a continuous stirred tank reactor (CSTR, capacity 4 L). Concurrently, an aqueous $Na_2CO_3$ solution (2.0 M), and a 0.2 M aqueous $NH_4OH$ solution were separately fed into the reactor. The solution was maintained at 50° C. for 12 hours with constant stirring (1000 rpm) at pH 7.5. Spherical ($Na_aNi_{1/2}Mn_{1/2}$)$CO_3$ powder was filtered, washed, and vacuum-dried at room temperature. The spherical powder was then dried at elevated temperature (100° C.) to remove adsorbed water. After drying at elevated temperature, the spherical powder was mixed with lithium carbonate and calcined at 600° C. for 5 hours to decompose the carbonate to obtain a composite oxide of $Li(Na_aNi_{1/2}Mn_{1/2})O_2$. The resultant composite oxide was reheated at about 600° C. in one example, and at about 900° C. in another example, where the temperature was maintained for approximately 20 hours, to obtain $Li(Na_aNi_{1/2}Mn_{1/2})O_2$, a composite oxide. The average particle size of the composite oxide was approximately 10 μm.

Powder X-ray diffraction (Rigaku, Rint-2000; powder XRD) employing Cu Kα radiation was used to identify the crystalline phase of the prepared powders at each stage. The prepared powders were also observed using scanning electron microscopy (SEM, JSM-6340F, JEOL). Charge-discharge studies were performed with a coin type cell (CR2032) at various constant current densities and at room temperature. The cell consisted of a positive $Li[Na_aNi_{1/2}Mn_{1/2}]O_2$ electrode and a negative lithium metal electrode, separated by a porous polypropylene film. The positive electrode contained 84 wt % active materials, 8% PVDF (polyvinylidene fluoride) binder, 4% carbon acetylene black, and 4% SFG-6, and was coated on an Al foil. The electrolyte was a 1:2 blend of ethylene carbonate (EC) and dimethyl carbonate (DMC) containing 1M $LiPF_6$.

TABLE 1

Compositions of the Two Materials at Different Temperatures in Example 1, As Determined By Inductively Coupled Plasma (ICP) Methods.

| Temp. | Li (wt %) | Na (wt %) | Ni (wt %) | Mn (wt %) |
|---|---|---|---|---|
| 600° C. | 7.78 | 0.40 | 27.2 | 27.0 |
| 900° C. | 7.64 | 0.42 | 27.1 | 26.7 |

Example 2

The procedure of Example 1 was repeated, except that, in addition, $CoSO_4 \cdot 7H_2O$ was used, in a ratio of Ni:Co:Mn=1:1:1, to form $(Ni_{0.33}Co_{0.33}Mn_{0.33})(CO_3)$.

Comparative Example 1

NiO and $Mn_3O_4$ were mixed in a Ni:Mn ratio of 1:1 by ball milling to obtain alkali-free transition metal oxides. The mixed oxides were then heat-treated as described for Example 1.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cathode material of general formula

wherein:
the $LiA_{a'}Ni_\alpha Co_\beta Mn_\gamma Mo_\delta M_y O_2$ and $Li_2Mn_y O_3$ components form a layered structure;
A is Na, K, or a mixture of Na and K;
M is Mg, Zn, Al, Ga, B, Zr, Si, Ti, Nb, W, or a mixture of any two or more thereof;
X is F, S, Cl, I, or a mixture of any two or more thereof;
x ranges from 0 to 1;
a' ranges from 0.01 to about 0.1;
α ranges from 0.01 to 1;
β ranges from 0 to 1;
γ ranges from 0.01 to 1;
δ ranges from 0 to 0.2; and
y ranges from 0 to 0.15.

2. The cathode material of claim 1, wherein A is Na.

3. The cathode material of claim 1, wherein α is 1, A is Na.

4. The cathode material of claim 1, wherein the material comprises a plurality of primary particles of less than about 300 nm in size and a plurality of nano-sized particles having an average secondary diameter of less than about 100 microns.

5. A rechargeable secondary battery electrode, comprising the cathode material of claim 1.

6. A positive electrode comprising a cathode material of general formula

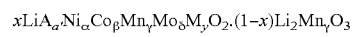

wherein:
the $LiA_{a'}Ni_\alpha Co_\beta Mn_\gamma Mo_\delta M_y O_2$ and $Li_2Mn_y O_3$ components form a layered structure;
A is Na, K, or a mixture of Na and K;
M is Mg, Zn, Al, Ga, B, Zr, Si, Ti, Nb, W, or a mixture of any two or more thereof;
X is F, S, Cl, I, or a mixture of any two or more thereof;
x ranges from 0 to 1;
a' ranges from 0.01 to about 0.1;
α ranges from 0.01 to 1;
β ranges from 0 to 1;
γ ranges from 0.01 to 1;
δ ranges from 0 to 0.2; and
y ranges from 0 to 0.15.

7. The positive electrode of claim 6, wherein A is Na.

8. The positive electrode of claim 6, wherein α is 1, A is Na.

9. The positive electrode of claim 8, wherein the cathode material comprises a plurality of primary particles of less than about 300 nm in size and a plurality of nano-sized particles having an average secondary diameter of less than about 100 microns.

* * * * *